UNITED STATES PATENT OFFICE.

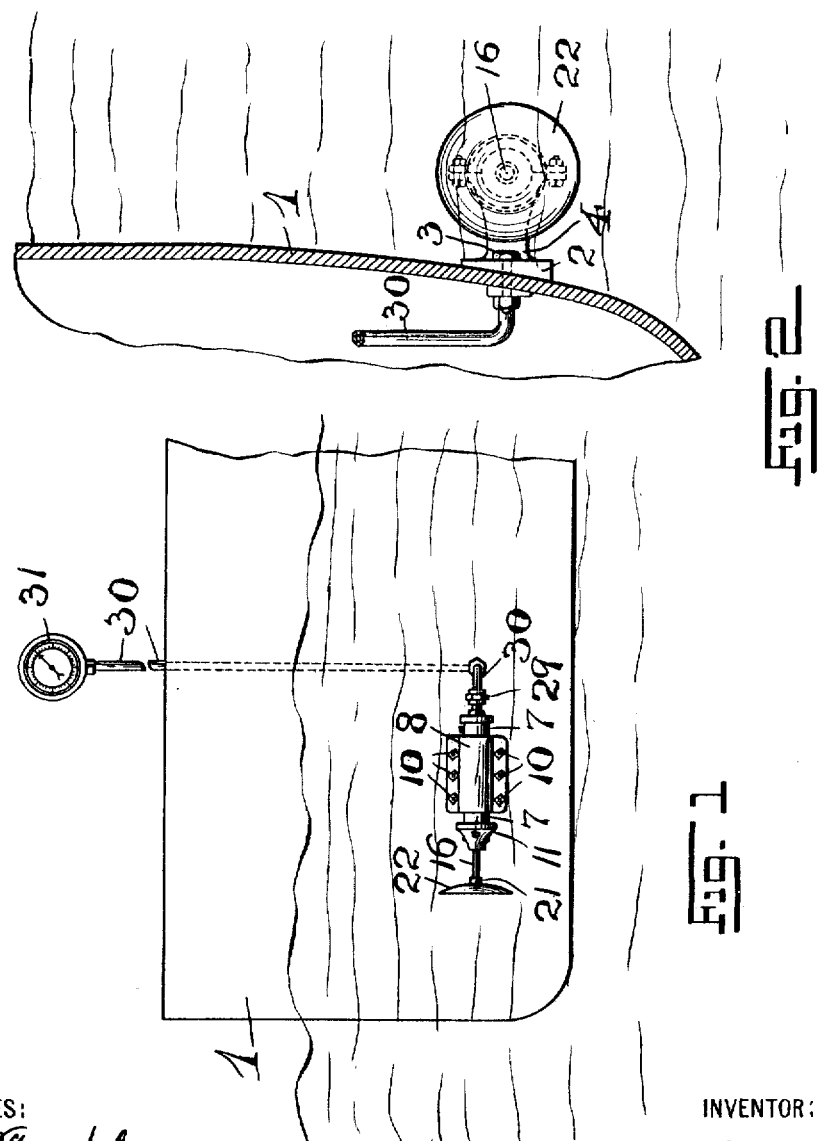

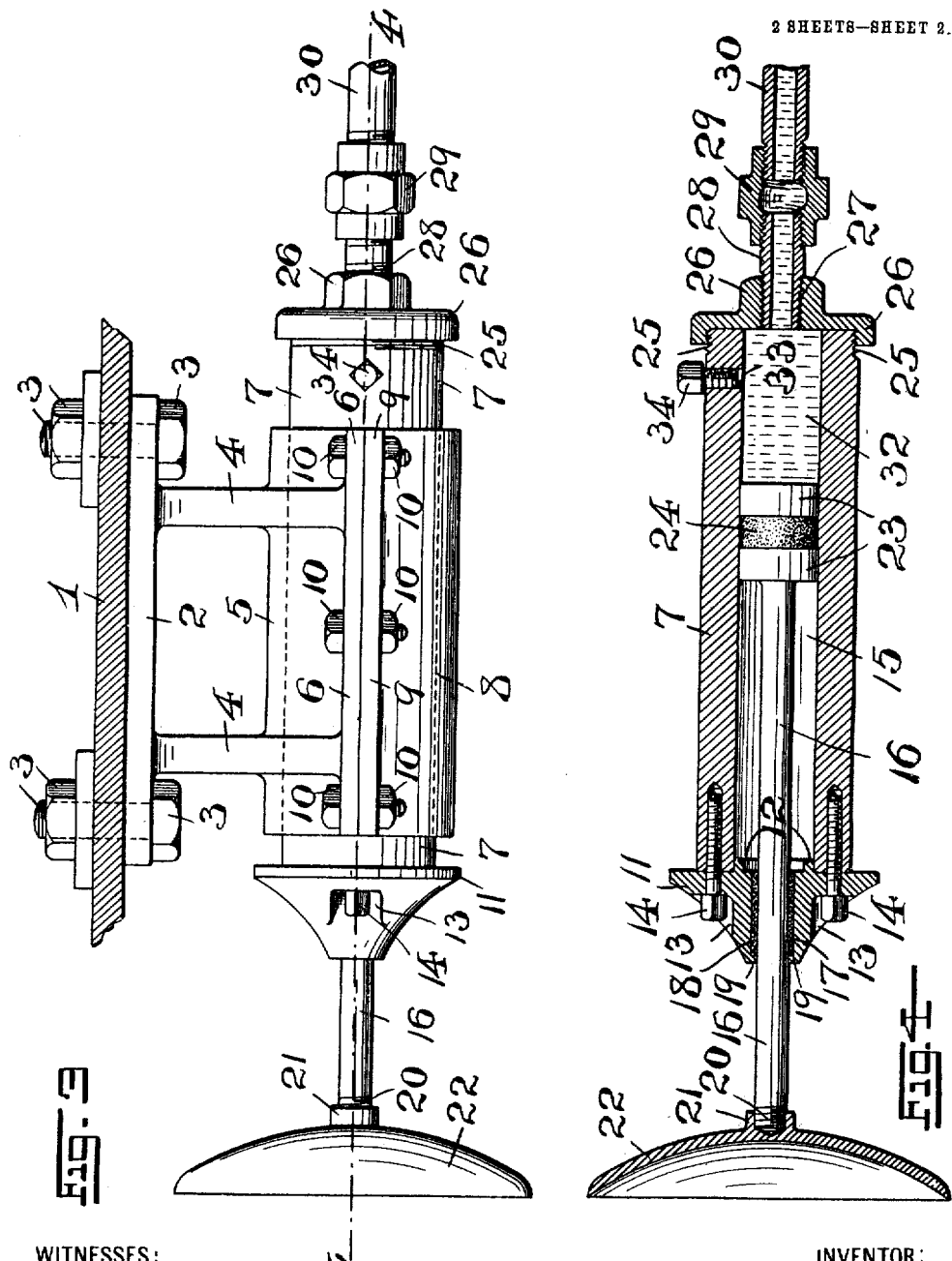

HEINRICH G. A. KLAPPROTH, OF HANOVER, GERMANY.

SPEED-INDICATOR OR LOG FOR SHIPS.

No. 904,135.　　　Specification of Letters Patent.　　　Patented Nov. 17, 1908.

Application filed October 23, 1907. Serial No. 398,737.

*To all whom it may concern:*

Be it known that I, HEINRICH G. A. KLAPPROTH, a subject of the Emperor of Germany, residing at Hanover, in the Province of Hanover and Kingdom of Prussia, Germany, have invented certain new and useful Improvements in Speed-Indicators or Logs for Ships; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in speed indicators or logs for ships; and the invention relates more particularly to a novel construction of speed - testing and indicating mechanism which is operated by the pressure or resistance offered to the same when attached to the hull of a ship or other vessel moving through the water. It is clearly evident that the greater the speed or momentum of the said ship or other vessel through the water, the greater is the resistance or pressure produced upon the speed-testing and indicating mechanism, and it is upon this principle that the indicator is caused to register the varying rates of speed with which a ship or vessel equipped with the present invention, is traveling.

The invention has for its principal object, therefore, to provide a novel and simple, but thoroughly efficient mechanism, to be attached to the exterior of the hull of a ship or other vessel below the low water line, whereby the resistance of the water thereto, as the ship or other vessel moves through the water, operates said mechanism and causes the same to register upon a speed-indicating dial the rate of speed at which the ship or other vessel is traveling.

A further object of the present invention is to provide a speed-testing and indicating mechanism having a cup-shaped disk secured to a piston, the latter being slidably arranged in a cylinder filled with glycerin or other suitable liquid, and means connecting said cylinder with a speed-indicating dial, all arranged in such a manner that the pressure of the water upon said disk, caused by the passage of the ship or other vessel through the said water, is directly transmitted to the column of liquid in the cylinder, which pressure is further transmitted by said liquid through a convenient means, such as a pipe or tube directly to the indicating dial-mechanism which is constructed in any of the well known styles of instruments of that character.

A further object of the present invention is to provide a means by which an indicating dial may be located in any convenient part of the ship or other vessel, and whereby either one or more indicating dials located in various parts of the ship may be operated to register the speed of said ship or other vessel by means of the single speed-testing or indicating mechanism embodying the principles of the present invention.

Other objects of the present invention not at this time more particularly mentioned will be clearly evident from the following detailed description of the same.

With the various objects of the present invention in view, the said invention consists, primarily, in the novel speed-testing or indicating mechanism hereinafter more fully set forth; and, furthermore, this invention consists in the arrangements and combinations of the various devices and parts hereinafter described and then finally embodied in the clauses of the claims, which are appended to and which form an essential part of this specification.

The invention is clearly illustrated in the accompanying drawings, in which:

Figure 1 is a semi-diagrammatic view of the speed-testing or indicating mechanism embodying the principles of the present invention, the same being fixed or secured upon the hull of a ship or other vessel, preferably near the keel, so that it is never lifted out of the water by the heave or roll of the said ship or other vessel, the indicating dial being shown in connection therewith; and which may be placed in various convenient locations upon said ship or other vessel, such, for example as the bridge, engine-room, officers' quarters, chart-room or the like. Fig. 2 is a detail vertical section taken through a portion of the hull of a ship or other vessel, and illustrates the mode of securing or attaching the said speed testing and indicating mechanism operatively thereto, the said mechanism being shown in front elevation. Fig. 3 is a top or plan view of the said mechanism, and the means for attaching or securing the same to the hull of the ship or other vessel, the said mechanism being shown on an enlarged scale. Fig. 4 is a vertical longitudinal section taken on line 4—4 in said Fig. 3, the bracket or securing means used to attach the same to the hull of the ship or other vessel being removed; and this view also being made on an enlarged scale.

Similar characters of reference are employed in all of the above described views, to indicate corresponding parts.

Referring now to the several figures of the said drawings, the reference character 1 indicates the hull-portion of a ship or other vessel; secured to the hull 1 preferably near the keel of the ship or other vessel, is a bracket, comprising, a base-member 2 fitted against the said hull 1 and secured in place by means of bolts and nuts 3, and extending outwardly from the said base-member 2, are arms 4. Integrally formed upon the free end of each arm 4 is a receiving-socket or bearing-like member 5 provided with flanges 6. A cylinder-member 7 is adapted to be secured in said receiving-socket or bearing-like member 5, and rigidly held therein by means of a receiving-socket cap 8 also provided with flanges 9 which register with the flanges 6 of the said receiving-socket or bearing-like member 5; bolts and nuts 10 connecting said flanges 6 and 9 to lock the parts together and rigidly secure the said cylinder-member 7 in its operative position. The said cylinder-member 7 is closed at its forward end by means of a cylinder-head 11, said cylinder-head having an annular flange 12 which extends into and engages with the bore of said cylinder-member 7. The said cylinder-head tapers outwardly from the end of the cylinder-member 7 and is preferably cone-shaped, said cylinder-head being further provided with cut-away portions 13 which provide seats for the heads of the bolts 14 which secure the said cylinder-head to the body of the cylinder-member 7.

Slidably arranged in the cylinder-head 11 and extending into the chamber 15, formed by the cylinder-member 7, is a piston-rod 16, the said cylinder-head being further provided with a packing-chamber 17 in which is placed a packing 18, said packing being protected against the action of the water, by means of the shoulder 19. The said piston-rod 16 is provided on its outer end which extends outwardly from the cylinder-member 7 with a screw-thread 20 upon which is screwed the screw-threaded receiving socket 21 of a concave or cup-shaped disk 22. This disk 22 by means of its concave shape presents a resistance to the water through which the ship or other vessel is passing; but, at the same time being rigidly and positively secured to the said piston-rod 16, is not subject to the danger of being broken or otherwise injured or disabled by the action of the water or the buffeting of the ship or other vessel by the waves in stormy weather, which is a decided improvement and advantage over old style-speed-testing and indicating mechanisms of this type; there is also a further advantage derived from this construction owing to its positive and direct action upon the piston-rod 16 and the interior mechanism of the cylinder, when the same is performing its functions.

Integrally formed upon the end of the piston-rod 16, which penetrates into the cylinder-chamber 15, is a piston-head 23, provided with any well-known form of packing-ring 24, or the like.

The cylinder-member 7 is provided upon its rear end with an exterior screw-thread 25 to which is screwed the closing member or cap 26; this closing member or cap 26 is provided with a screw-threaded opening 27 adapted to receive a correspondingly screw-threaded pipe or conduit 28. Joined to the pipe or conduit 28, by means of a union 29, of any durable or well-known construction, is another pipe or conduit 30. This pipe or conduit 30 passes through the hull of the ship or other vessel and is connected directly to an indicating-dial 31 suitably located in any part of the said ship.

The said chamber 15 of the cylinder member 7 contains glycerin 32, or any similar fluid. The pressure or resistance of the water acting upon the disk 22 operates to force the piston rod 16 and its piston-head 23 against the column of glycerin 32 in the said cylinder chamber 15, whereby the said glycerin is forced through the said pipes or conduits 28 and 30, and by means of which the pressure upon the said column of fluid is transmitted direct to the well-known mechanism of an indicating dial 31, upon which the speed of the ship or other vessel is indicated.

In order to renew the charge of glycerin 32 contained in the cylinder-chamber 15, if by any reason, such as leakage, the same becomes depleted, the cylinder member 7 is provided with a hole or opening 33 through which the glycerin may be inserted therein, said hole or opening 33 being closed ordinarily by means of the screw-threaded plug 34.

It will be clearly evident from the foregoing description that a very simple, effective and durable speed testing or indicating mechanism for ships or other vessels is provided by the present invention, and a construction is the result which is greatly simplified without losing any of its efficiency but rather increasing its efficiency.

I claim:—

1. In a speed testing mechanism for ships, the combination, with the hull of a ship, of a cylinder, a bracket for securing said cylinder to said hull, a fluid in said cylinder, a piston rod and head slidably arranged in said cylinder, a speed-indicating mechanism a concave disk rigidly connected with the free end of said piston-rod adapted to offer a resistance to the water through which the ship passes, so as to exert a pressure upon said fluid by means of the sliding piston-rod and head, and by means of said fluid distributing said pressure to said speed-indicating mechanism, to operate the same, substantially as and for the purposes set forth.

2. In a speed testing mechanism for ships, the combination, with the hull of a ship, of a bracket, a cylinder secured in said bracket, a fluid, in said cylinder, a piston rod and head slidably arranged in said cylinder, a speed-indicating mechanism, a concave disk rigidly secured to the free end of said piston rod adapted to offer a resistance to the water through which the ship passes so as to exert a pressure upon said fluid and by means of said fluid distributing said pressure to said speed-indicating mechanism, substantially as and for the purposes set forth.

3. In a speed testing mechanism for ships, the combination of a cylinder, means for securing said cylinder to the hull of a ship, a chambered cone-shaped cylinder-head closing the front end of said cylinder, a piston-rod slidably arranged in said cone-shaped cylinder-head, a packing in the chamber in said cone-shaped cylinder head surrounding said piston-rod, a piston-head connected with said piston-rod and slidably arranged in said cylinder, packing surrounding said piston-head, a speed-indicating mechanism, a concave-disk rigidly secured to the free end of said piston-rod, a fluid, in said cylinder, and means connected with said cylinder for conducting said fluid to said speed-indicating mechanism to operate the same when pressure is exerted upon the said fluid, substantially as and for the purposes set forth.

4. In a speed testing mechanism for ships, the combination of a cylinder, means for securing said cylinder to the hull of a ship, a chambered cone-shaped cylinder head closing the front end of said cylinder, a piston-rod slidably arranged in said cone-shaped cylinder, a packing in the chamber in said cone-shaped cylinder head surrounding said piston-rod, a piston-head connected with said piston-rod and slidably arranged in said cylinder, packing surrounding said piston-head, a speed-indicating mechanism, a concave-disk rigidly secured to the free end of said piston-rod, a fluid, in said cylinder, and means connected with said cylinder for conducting said fluid to said speed-indicating mechanism to operate the same when pressure is exerted upon the said fluid, comprising, a closing cap screwed upon the rear end of said cylinder, a pipe connected with said closing-cap, a union connected with said pipe and another pipe leading from said union to and connecting with said speed-indicating dial, substantially as and for the purposes set forth.

5. In a speed testing mechanism for ships, the combination with the hull of a ship, of a bracket, a cylinder secured in said bracket, a closing cap screwed upon the rear end of said cylinder, a pipe connecting said cylinder with the mechanism of a speed indicating dial, a fluid, in said cylinder and said pipe, a piston rod and head slidably arranged in said cylinder, a speed-indicating mechanism, a concave-disk rigidly secured to the free end of said piston-rod adapted to offer a resistance to the water through which the ship passes so as to exert a pressure upon said fluid and by means of said fluid distributing said pressure to said speed-indicating mechanism, to operate the same, substantially as and for the purposes set forth.

In testimony, that I claim the invention set forth above I have hereunto set my hand this 18th day of October, 1907.

HEINRICH G. A. KLAPPROTH.

Witnesses:
MAYBELLE McADOO,
GEORGE D. RICHARDS.